United States Patent [19]

Mikami et al.

[11] 3,912,979

[45] Oct. 14, 1975

[54] PILOT WIRE PROTECTIVE RELAYING APPARATUS

[75] Inventors: Ichiro Mikami; Hidesuke Sugai; Yosuke Tsujikura; Toshinobu Ebisaka, all of Kobe, Japan

[73] Assignee: Mitsubishi Denki Kabushiki Kaisha, Japan

[22] Filed: Mar. 26, 1974

[21] Appl. No.: 454,848

[30] Foreign Application Priority Data
Mar. 31, 1973 Japan.................................. 48-37065

[52] U.S. Cl. ............................. 317/27 A; 317/28 B
[51] Int. Cl.[2] ........................................ H02H 3/26
[58] Field of Search .... 317/28 B, 27 A, 29 B, 27 R, 317/28 R, 29 R

[56] References Cited
UNITED STATES PATENTS
2,027,237  1/1936  Vesconte............................ 317/28 B
3,597,735  8/1971  Nakayama et al. ................ 317/27 A Primary Examiner—James D. Trammell
Attorney, Agent, or Firm—Robert E. Burns; Emmanuel J. Lobato; Bruce L. Adams

[57] ABSTRACT

The disclosed apparatus comprises a conventional pilot wire exclusively used for the operating force and a separate pilot wire exclusively used for the restraining force. At each of terminals of a protected line a voltage converted from a current flowing there is transmitted to the remaining terminals through the separate pilot wire, and a restraining voltage derived from the separate pilot wire is phase compared with an operating voltage similarly derived from the associated pilot wire. The restraining voltage is decreased with both voltages in phase and increased when it is maintained at least at its magnitude as derived with the voltages in reverse phase with each other. When the operating voltage is higher a predetermined magnitude than the thus controlled restraining voltage as determined by a determination circuit, the associated circuit breaker is opened.

3 Claims, 5 Drawing Figures

PILOT WIRE PROTECTIVE RELAYING APPARATUS

BACKGROUND OF THE INVENTION

This invention relates to a pilot wire protective relaying apparatus for protecting a multiple-terminal transmission line.

As well known, the pilot wire protection for lines can utilize the operating principle of either the opposite voltage or circulating current type for electric systems including at most two terminals. For the three terminal system, however, the opposite voltage type produces an error output that can not be ignored upon the occurrence of any external fault because of the presence of an voltage limiting circuit involved. Thus there has been no choice but to rely upon the circulating current type of pilot wire protection. But with the circulating current type used in the three terminal system, the operating input enters each of the terminals of the system upon the occurrence of an external fault that the particular fault current flows through two terminals. This is because the impedance of the associated pilot wire itself can not be ignored. At that time, those two terminals through which the fault current is flowing are applied with a high restraining input proportional to the fault current flowing therethrough resulting in no malfunction. However, the remaining terminal or the no-current terminal has applied thereto the operating input alone but not such a restraining input and is apt to perform malfunction. For this reason, the existing pilot wire protection for multiple-terminal systems has been restricted to at most three terminal type. Thus such protection has been considered to be theoretically impossible for electric systems including four terminals or more.

SUMMARY OF THE INVENTION

The present invention provides a pilot wire protective relaying apparatus comprising, in combination, a protected line including a plurality of terminals, a first pilot wire for transmitting a current flowing through each of the terminals of the protected line to the remaining terminals, first deriving circuit means at each terminal to transmit an operating voltage dependent upon a difference current between the total inflow current and the total outflow current at each of the terminal flowing through the first pilot wire, conversion means at each terminal to convert a current flowing through each of the terminals to a voltage, a second pilot wire for transmitting the voltage from the conversion means at each of the terminals to the remaining terminals, second deriving circuit means at each terminal to derive, as a restraining voltage, a voltage produced on the second pilot wire, a phase comparison circuit at each terminal to compare the phase of the restraining voltage with that of the operating voltage to control the magnitude of the restraining voltage in accordance with the result of the comparison, and a final determination circuit operative in response to the relationship between the magnitudes of the operating voltage and the restraining voltage provided by the phase comparison circuit.

Accordingly it is an object of the present invention to provide a new and improved pilot wire protective relaying apparatus applicable to protected lines including not only three terminals but also four terminals or more.

It is another object of the present invention to provide a new and improved pilot wire protective relaying apparatus for protecting a transmission line including three terminals or four terminals or more substantially free from any malfunction without relying on the saturation of saturable transformers, previously employed and by ensuring that a restraining force is transmitted even to no-current terminal or terminals.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
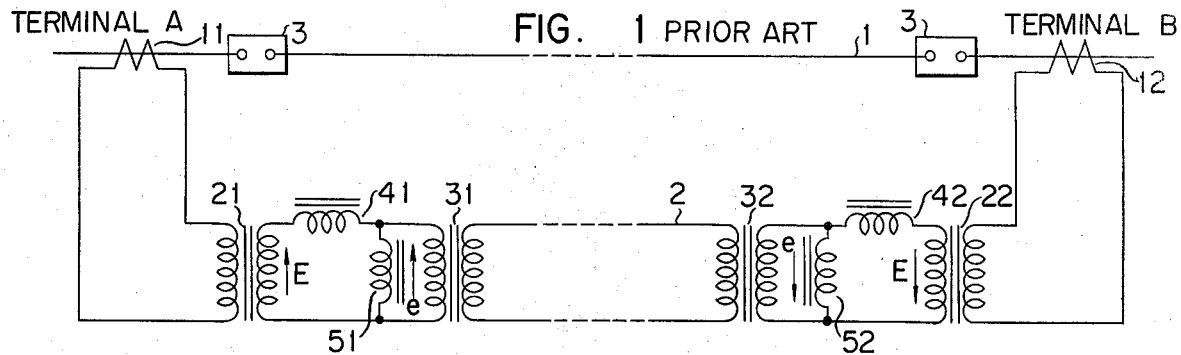
FIG. 1 is a circuit diagram of a pilot wire protective relaying apparatus for a two terminal system constructed in accordance with the principles of the prior art.

Referring now to the drawing and FIG. 1 in particular, there is illustrated a conventional pilot wire protective relaying apparatus. The arrangement illustrated comprises a protected line 1 that is the object of protection, including a pair of terminals A and B, and a pilot wire 2 serving to transmit the status of the protected line 1 at each of the terminals A or B to the other terminal B or A. More specifically, one current transformer 11 or 12 is electromagnetically coupled to the protected line 1 at each of the terminals A or B and has a secondary side connected to a saturable transformer 21 or 22, on the primary side. The secondary side of each of the saturable transformers 21 or 22 is operatively connected to the pilot wire 2 through an insulating transformer 31 or 32 serving to electrically isolate a relaying element as will be subsequent described from high voltages induced on the pilot wire 2. Thus the secondary output from the current transformer 11 or 12 disposed at each of the terminals A or B respectively is adapted to be transmitted to the other terminal B or A through the pilot wire 2.

As shown in FIG. 1, the saturable transformer 21 or 22 has a secondary side connected across the primary side of the associated insulating transformer 21 or 22 through a series restraining winding 41 or 42 with an operating winding 51 or 52 connected in parallel thereto. The restraining winding is adapted to be energized with a current flowing through that terminal at which the same is disposed while the operating winding is adapted to be energized with a difference current between the total inflow current and the total outflow current at each terminal transmitted through the pilot wire thereto. The restraining and operating windings 41 and 51 respectively form a relaying element at the terminal A to control the opening and closing of a circuit breaker 3 connected in the line 1 adjacent that terminal. Similarly, the restraining and operating windings 42 and 52 respectively form a relaying element at the terminal B to control the opening and closing of a circuit breaker 3 connected in the line 1 adjacent that terminal.

The pilot wire protective relaying apparatus is typically shown in FIG. 1 as including two terminals but it is to be understood that the same connection as that shown in FIG. 1 is applied to pilot wire protective relaying apparatus including three terminals.

Figures 2, 3, 4:
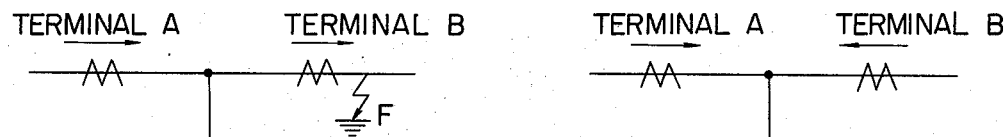
FIGS. 2, 3 and 4 are diagrams useful in explaining faults developed in a three terminal system.

Referring now to FIG. 2, there is illustrated a direction in which a fault current flows through a protected line including three terminals A, B and C in response to a fault F occurring outside of the terminal B with respect to the protected line 1. Only the terminal C is not connected to a source of electric power. As shown at the arrows in FIG. 2, the fault current is flowing from the terminal A through the terminal B to a point where the fault A has occurred.

FIG. 3 shows a voltage distribution developed on the pilot wire 2 resulting from the occurrence of the fault F as above described in conjunction with FIG. 2.

Upon the occurrence of such an external fault in which a fault current flows through terminals A and B while no current flows through the terminal C, the saturable transformers 21 and 22 at the terminals A and B have opposite voltages E induced in the directions of the arrows shown in FIGS. 1 and 3 on the secondary sides thereof. Therefore the electrical center of the pilot wire 2 will have a null error voltage. Actually, the operating windings 51 and 52 at the terminals A and B have applied thereto opposite error inputs e as shown in FIGS. 1 and 3 because the pilot wire 2 has its own impedance. Under these circumstances, the terminals A and B perform no malfunction in response to the error inputs applied thereto. This is because each of the restraining windings 41 or 42 has flowing therethrough a high current flowing through that terminal where the winding is disposed. However, the terminal C through which no fault current flows has applied thereto only an error input such as above described, but not any restraining input resulting in a tendency to perform malfunction for the following reasons. If a branch leading to the terminal C is separated from the pilot wire 2 exactly at the electrical center thereof intermediate the terminals A and B then a null error input is applied to the terminal C offering no problem. However that branch is usually separated from the pilot wire at a point other than the electrical center thereof so that an error input is necessarily present at the terminal C even though it would not be so high as the error voltage e at each of the terminals A and B. In addition, the tendency to perform malfunction at the terminal C becomes more remarkable with an increase in the voltage E as above described.

To avoid these objections, it has been usually practiced to utilize the saturation of the saturable transformers 21 and 22 thereby to maintain the voltage E induced on the secondary side of each transformer 21 or 22 at a predetermined magnitude even upon the occurrence of an external fault in which a flaut current flows from the terminal A through the terminal B. It is the existing condition that, by receiving an input from the current transformer at each terminal by the associated saturable transformer, each terminal barely prevented from performing malfunction.

The use of the saturable transformers as above described has been also disadvantageous upon the occurrence of a multiple fault at the internal and external points $F_1$ and $F_2$ respectively of the protected line 1 with respect to the terminal C as shown in FIG. 4. As shown in FIG. 4, the occurrence of such a multiple fauls leads to both a flow of current into each of the terminals A or B and a flow of considerably high current from the terminal C. Under these circumstances a restraining force at the terminal C has the resultant magnitude of the currents flowing through the terminals A and B respectively, whereas operating forces at the three terminals are identical in magnitude to one another. Thus the terminal C is difficult to be properly operated tending to perform malfunction. The existing pilot wire protective relaying apparatus have been set to be narrowly applicable to the three terminal type by adjusting them so as to minimize both objections as above described. From this it will be appreciated that the existing apparatus as above described are disabled to be theoretically applied to what includes four terminals or more.

The present invention contemplates to provide a pilot wire protective relaying apparatus also applicable to the pilot wire protection of protected lines including even four terminals or more. According to the principles of the present invention, a pilot were exclusively used for the restraining force is separately provided in addition to a pilot wire previously used (which is, in this case, exclusively used for the operating input). Then a current flowing through each of terminals is converted to a corresponding voltage which is, in turn, transmitted to the remaining terminals through the separate pilot wire exclusively used for the restraining force. At each terminal, a restraining voltage derived from the restraining pilot wire is phase compared with an operating voltage derived from the operating pilot wire and then the restraining voltage is controlled in magnitude in accordance with the result of the comparison.

Figure 5:
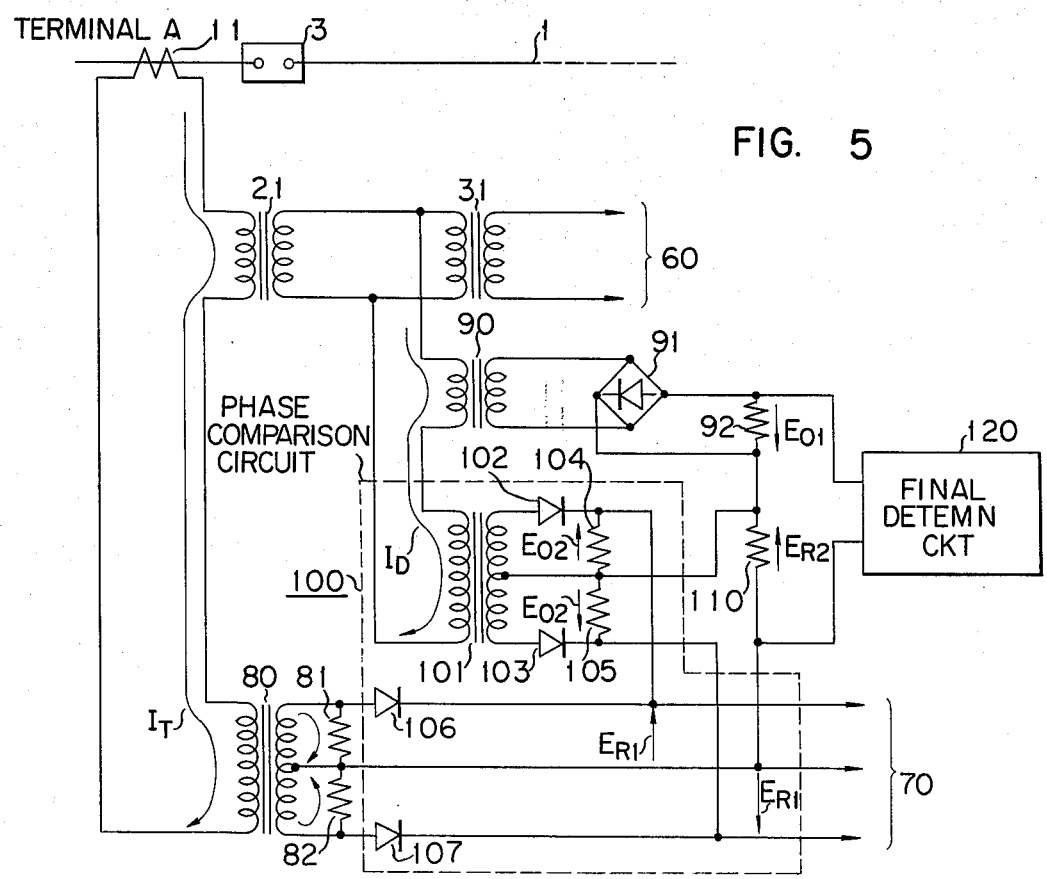
FIG. 5 is a fragmental circuit diagram of a pilot wire protective relaying apparatus constructed in accordance with the principles of the present invention.

Referring now to FIG. 5 wherein like reference numerals designate the components identical or corresponding to those shown in FIG. 1, there is illustrated a pilot wire protective relaying apparatus constructed in accordance with the principles of the present invention. While the apparatus is shown in FIG. 5 as including a single terminal only for purposes of illustration it is to be understood that the same connection at that shown in FIG. 5 is also applied to apparatus including two terminals or more.

The arrangement illustrated comprises a first pilot wire schematically designated by the reference numeral 60 and operatively coupled to the current transformer 11 connected in the protected line 10 at the terminal A through the insulating transformer 31 and the saturable transformer 21. The first pilot wire 60 is of the conventional construction such as above described in conjunction with FIG. 1. For the protected line 1 including a plurality of terminals, for example three terminals A, B and C, the pilot wire 60 has the other ends (not shown) operatively connected to the respective terminals B and C through insulating transformers, saturable transformers and current transformers identical in both construction and connection to those shown in FIG. 5. This is true in the case of a second pilot wire as will be subsequently described. The first pilot wire 60 is operative to transmit a current flowing through each of the terminals of the protected line 1 to the remaining terminals (not shown) thereby to derive a difference current between the total inflow current and the total outflow current at each terminal as above described. The difference current provides an operating force. The arrangement further comprises a second pilot wire schematically designated by the reference numeral 70 and operatively connected to the current transformer 11 through a transformer 80 and a saturable transformer 21 whose primary winding is connected to the primary winding of the transformer. The transformer 80 serves to introduce a restraining force developed at the associated terminal, in this case, the terminal A into the second pilot wire 70. The second pilot wire 70 is operative to transmit a restraining quantity or the restraining force at each terminal to the remaining terminals to derive a restraining voltage $E_{R1}$ (see FIG. 5) corresponding to a maximum one of the restraining quantities at all the terminals. The transformer 80 includes a center-taped secondary winding having a pair of resistors 81 and 82 connected in series circuit relationship thereacross with the junction of the resistors 81 and 82 connected to the center tap on the secondary winding. Each of the resistors 81 and 82 serves to convert a restraining current applied to the primary transformer 80 winding to a corresponding voltage in accordance with the polarity of the restraining current. The converted voltage is then delivered to the second pilot wire 70.

In order to derive the difference current at each terminal as above described from the first pilot wire 60, a transformer 90 for introducing an operating force is coupled in parallel circuit relationship with the saturable transformer 21 and therefore the insulating transformer 31 and has a secondary winding connected across a rectifier 91. The rectifier 91 rectifies the output from the transformer 90 into a direct current. Then this direct current is applied to a resistor 92 connected across the output of the rectifier 91 to be converted to a corresponding operating voltage $E_{01}$ thereacross.

The transformer 90 is connected to a phase comparison circuit generally designated by the reference numeral 100. More specifically, the phase comparison circuit 100 includes a transformer 101 having a primary winding serially connected to the primary winding of the transformer 90 across the secondary winding of the saturable transformer 21 or the primary winding of the insulating transformer 31. Therefore the transformer 101 has applied thereto the above mentioned difference current at each terminal produced on the first pilot wire 60, that is, an operating force. The transformer 101 includes a center tapped secondary winding connected through a pair of semiconductor diodes 102 and 103 to a series combination of resistors 104 and 105 with the junction of both resistors connected to the center tap on the secondary transformer 101 winding. Then the junction of the diode and resistor 102 and 104 respectively is connected to one conductor connected to the second pilot wire 70 and also to the one end terminal of the transformer 80 through semiconductor diode 106. Similarly the junction of the diode and resistor 103 and 105 respectively is connected to a separate conductor connected also to the second pilot wire 70 and to the other end terminal of the transformer 80 through a semiconductor diode 107. Further the junction of the resistors 104 and 105 is connected by a resistor 110 to a neutral conductor connected to the second pilot wire 70 and also to the junction of the resistors 81 and 82 and therefore to the center tap on the secondary transformer 80 winding.

The resistor 110 is connected across a final determination circuit 120 through the resistor 92 serially connected thereto.

An output from the transformer 101 is rectified by either the diode 102 or 103 and applied across either the resistor 104 or 105 in accordance with the polarity of a current flowing through the primary transformer 101 winding to provide thereacross an operating voltage $E_{02}$ proportional to the operating force. This operating voltage $E_{02}$ is phase compared with the restraining voltage $E_{R1}$ provided by rectifying the output from the transformer 80 by the diode 106 and 107 as the case may be. This comparison results in a voltage drop across the resistor 110. That is, the resistor 110 produces a restraining voltage $E_{R2}$ having a magnitude controlled in accordance with the result of the phase comparison. More specifically, the restraining voltage is decreased with the operating and restraining voltages in phase with each other and maintained at least at the magnitude thereof as produced with both voltages in opposite phases.

Subsequently the restraining voltage $E_{R2}$ and the operating voltage $E_{01}$ are applied in opposite polarity relationship across the final determination circuit 120. The circuit 120 is responsive to the operating voltage $E_0$ exceeding a predetermined magnitude with respect to the restraining voltage $E_{R2}$ to open a circuit breaker 3 connected in the protected line 1 adjacent the associated terminal, in this case, the terminal A.

Assuming that an internal fault has occurred in the protected line 1, an operating current $I_D$ and a restraining current $I_T$ flow through the serially connected primary windings of the transformers 96 and 100 and of the transformers 21 and 80 respectively in the directions of the arrows shown in FIG. 5. Then the restraining current $I_T$ causes the resistor 81 or 82 to produce thereacross a restraining voltage $E_{R1}$ in phase with an operating voltage $E_{02}$ developed across the resistor 104 or 105 due to the operating current $I_D$. Therefore a restraining voltage $E_{R2}$ applied to the final determination circuit 120 is of $E_{R1}-E_{02}$. Assuming that the operating voltage $E_{02}$ is chosen to be higher than the restraining voltage $E_{R1}$, only the operating voltage $E_{01}$ is applied to the circuit 120. This is because the operating voltage $E_{02}$ has the sense blocked by the diode 106 or 107 so that the restraining force $E_{R2}$ becomes null. Under these circumstances, the final determination circuit 120 is operated to open the circuit breaker 3.

Upon the occurrence of an external fault, however, a fault current flows through that terminal nearest to the particular fault point and externally of the associated projected line and has the outflow phase. The fault current has a reverse phase as compared with an internal fault such as above described. Then the outflow current with a high magnitude at that terminal is transmitted to all the remaining terminals through the second pilot wire 70. In this case, an operating voltage $E_{02}$ is, as a matter of course, different in phase from the associating restraining voltage $E_{R1}$. If the voltage $E_{02}$ is theoretically opposite in phase to the voltage $E_{R1}$ then the resistor 110 has left thereon the restraining voltage $E_{R1}$ divided by a voltage divider consisting of the resistor 104 or 105 and the resistor 110. This ensures that the final determination circuit 120 is maintained inoperative.

From the foregoing it will be appreciated that the present invention can protect a transmission line including three terminals and even four terminals or more with means ensuring that a restraining force can be transmitted even to a no-current terminal of terminals without malfunction and therefore without relying on the saturation of saturable transformers involved.

While the present invention has been illustrated and described in conjunction with a single preferred embodiment thereof it is to be understood that numerous changes and modifications may be resorted to without departing from the spirit and scope of the present invention.

What we claim is:

1. A pilot wire protective relaying apparatus comprising, in combination, a protected line including a plurality of terminals, a first pilot wire for transmitting a current at each of said terminals of said protected line to the remaining terminals, first deriving circuit means at each terminal to transmit an operating voltage dependent upon a difference current between the total inflow current and the total outflow current at each of said terminals flowing through said first pilot wire, conversion means at each terminal to convert a current flowing through each of said terminals to a voltage, a second pilot wire for transmitting said voltage from said conversion means at each of said terminals to the remaining terminals, second deriving circuit means at each terminal to derive, as a restraining voltage, a voltage produced on said second pilot wire, a phase comparison circuit at each terminal to compare the phase of said restraining voltage with that of said operating voltage to control the magnitude of said restraining voltage in accordance with the result of the comparison, and a final determination circuit operative in response to the relationship between the magnitudes of said operating voltage and said restraining voltage provided by said comparison circuit.

2. A pilot wire protective relaying apparatus comprising, in combination, a protected line including a plurality of terminals, a first pilot wire for transmitting a current flowing through each of said terminals of said protected line of the remaining terminals, first deriving circuit means at each terminal to transmit an operating voltage dependent upon a difference current between the total inflow current and the total outflow current at each of said terminals flowing through said first pilot wire, conversion means at each terminal to convert a current flowing through each of said terminals to a voltage, a second pilot wire for transmitting said voltage from said conversion means at each of said terminals to the remaining terminals, second deriving circuit means at each terminal to derive, as a restraining voltage, a maximum one of voltages produced on said second pilot wire, a phase comparison circuit at each terminal to compare the phase of said restraining voltage with that of said operating voltage to control the magnitude of said restraining voltage in accordance with the result of the comparison, a final determination circuit operative in response to the relationship between the magnitudes of said operating voltage and said restraining voltage provided by the phase comparison circuit, and a circuit breaker controlled with an output from said final determination circuit.

3. A pilot wire protective relaying apparatus comprising, in combination, a protected line including a plurality of terminals, a first pilot wire for transmitting a current flowing through each of said terminals of said protected line to the remaining terminals, first deriving circuit means at each terminal to transmit an operating voltage dependent upon a difference current between the total inflow current and the total outflow current at each of said terminals flowing through said first pilot wire, conversion means at each terminal to convert a current flowing through each of said terminals to a voltage, a second pilot wire for transmitting said voltage from said conversion means at each of said terminals to the remaining terminals, second deriving circuit means at each terminal to derive, as a restraining voltage, a maximum one of voltages produced on said second pilot wire, a phase comparison circuit at each terminal to compare the phase of said restraining voltage with that of said operating voltage to control said restraining voltage so that said restraining voltage is decreased with the two voltages in phase with each other and maintained at least at the magnitude thereof as produced during an opposite phase condition a final determination circuit responsive to the operating voltage exceeding a predetermined magnitude with respect to said restraining voltage from said phase comparison circuit to produce an output, and a circuit breaker responsive to the output from said final determination circuit to be opened.

* * * * *